United States Patent [19]

Brooks

[11] Patent Number: 5,061,107

[45] Date of Patent: Oct. 29, 1991

[54] TORFLEX PIVOT

[75] Inventor: John J. Brooks, Santa Ynez, Calif.

[73] Assignee: Santa Barbara Research Center, Goleta, Calif.

[21] Appl. No.: 455,198

[22] Filed: Dec. 22, 1989

[51] Int. Cl.$^5$ ............................. F16B 1/00; F16D 1/00
[52] U.S. Cl. ....................................... 403/24; 403/291; 464/100
[58] Field of Search ................... 403/291, 24; 464/100; 267/160; 74/5 F

[56] References Cited

U.S. PATENT DOCUMENTS

| | | | |
|---|---|---|---|
| 3,073,584 | 1/1963 | Troeger | 267/160 |
| 3,181,918 | 5/1965 | Troeger | 267/160 X |
| 3,211,011 | 10/1965 | Litty | 74/5 F |
| 4,405,184 | 9/1983 | Bahiman | |
| 4,802,784 | 2/1989 | Brooks | |
| 4,812,072 | 3/1989 | Brooks | |

FOREIGN PATENT DOCUMENTS 200011  9/1987  Japan ..................... 403/291

*Primary Examiner*—Andrew V. Kundrat
*Attorney, Agent, or Firm*—W. C. Schubert; W. K. Denson-Low

[57] ABSTRACT

A structural pivot 10 includes a first sleeve 18 and a second sleeve 20 which are connected by a pair of parallelogram shaped flexible elements 22 and 24. The flexible elements include tapered ends 40, 42 and 44, 46, respectively. The tapered ends of the flexible elements are connected to sleeves 18, 20 so that the flexible elements 22, 24 are assembled in a crisscross fashion while the flexible elements remain spaced from each other. During angular rotaton of the sleeves, the flexible elements undergo both flexural and torsional action.

14 Claims, 2 Drawing Sheets

U.S. Patent    Oct. 29, 1991    Sheet 1 of 2    5,061,107
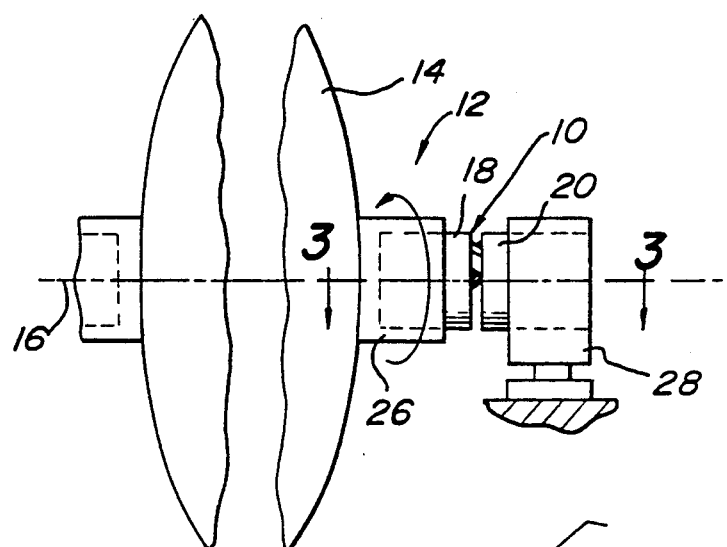
Fig-1
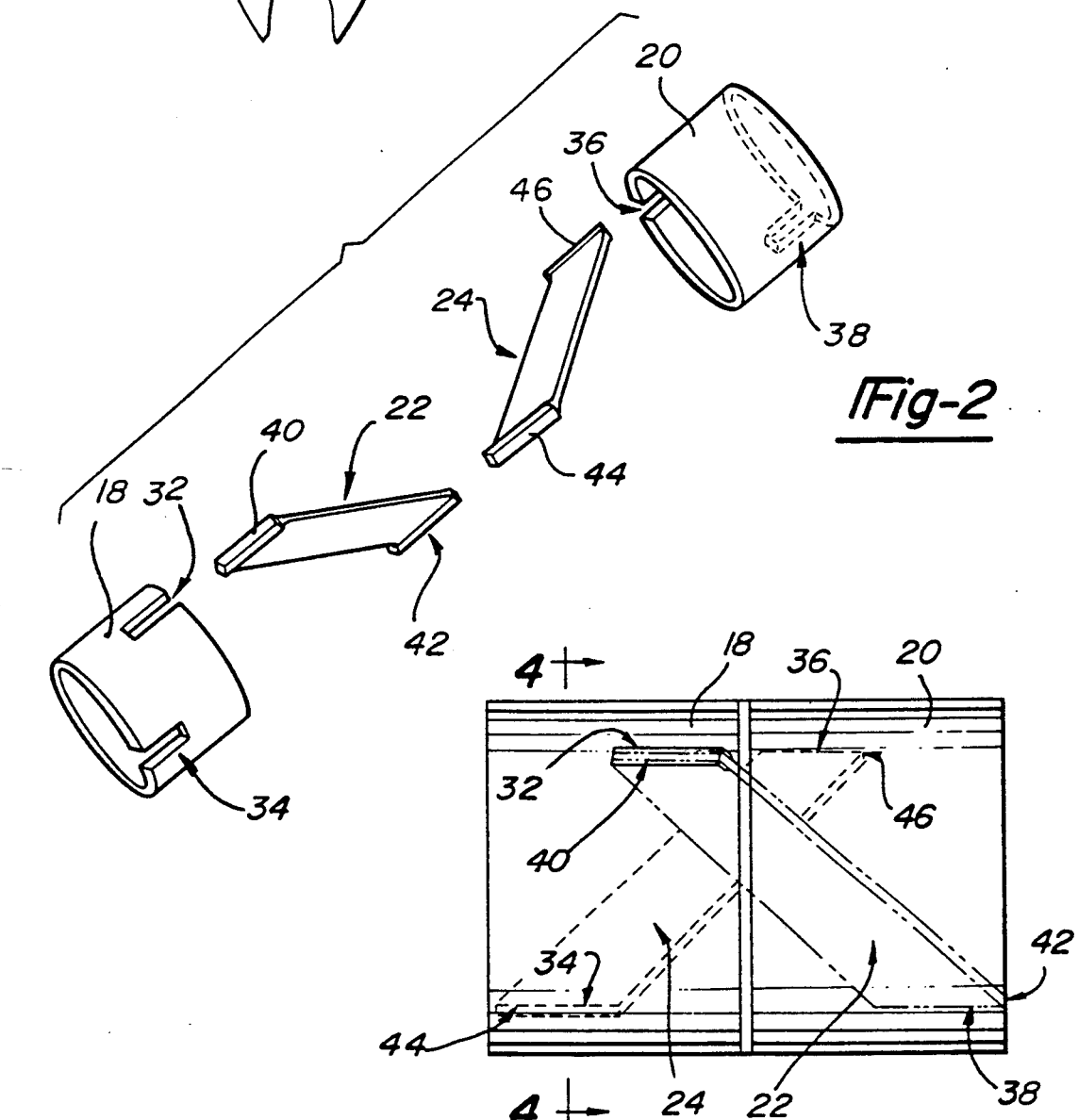
Fig-2
Fig-3

TORFLEX PIVOT

BACKGROUND OF THE INVENTION

1. Technical Field

This invention relates to joints for rotating members and, more particularly, structural pivots.

2. Discussion

Structural pivots are often used to overcome many of the disadvantages associated with other types of rotating joints such as knife edges, bearings, ball and socket joints and the like. Among the advantages of structural pivots is the elimination of friction, backlash, wear, the lack of requirement for lubrication, insensitivity to contamination, and the ability to operate over a wide range of environmental conditions. Structural pivots can be used in a wide variety of applications such as in gimbal ring mounts, pressure transducers, throttle linkages and automatic bag fillers. They are also finding increasing application in optical systems for mounting oscillating mirrors and the like.

One of the best known commercially available structural pivots is the "Free-Flex" pivot marketed by the Electric and Fluid Power Division of The Bendix Corporation. The construction of the Free-Flex pivot is described in the trade literature and in a paper by Troeger, "Considerations in the Application of Flexural Pivots", Automatic Control Data Systems Engineering Volume 17, No. 4, November, 1962. Despite its several advantages, the Free-Flex design also has its share of disadvantages. One particular drawback is that the geometric center of its rotating member will shift as the member is angularly deflected. As a result, its use in several applications like the above-mentioned precision optical systems is limited unless special precautions are taken.

Those skilled in the art have not been satisfied with leaving the state of pivot technology unimproved. Pivots that have been designed after the Free-Flex pivot include the pivots disclosed in U.S. Pat. No. 4,405,184, to Bahiman, entitled "Unidirectional Flexural Pivot," and disclosed in U.S. Pat. No. 4,802,784, to Brooks, entitled "Bi-Flex Pivot," and disclosed in U.S. Pat. No. 4,812,072, also to Brooks, entitled "Torsion Structural Pivot." A distinct disadvantage of the Bahiman pivot, which utilizes only flexural action in its flexible elements, is that it will rotate in only one direction. The Brooks pivots will rotate in both directions and substantially eliminate the geometric center shift of its rotating members, that was a disadvantage of the Free-Flex pivot. However, the Brooks pivots both utilize only one type of motion, either flexural or torsional respectively. While the Brooks pivots represent an improvement over both the Free-Flex and Unidirectional Flexural pivots, it would still be desirable to improve upon the Brooks pivots by increasing pivot reliability, extending pivot life, reducing pivot stress and non-linearity, and increasing pivot strength or rotation angle range.

SUMMARY OF THE INVENTION

Pursuant to the present invention, a structural pivot is provided that utilizes both flexural and torsional motion in its elements during angular deflection of its sleeves, and provides greater reliability and either greater pivot strength or greater pivot rotation angle range. Both of the rotating members are in the form of cylindrical sleeves sharing a common axis. A pair of flexible connecting elements are provided each having two free ends. The first free end of the first element is connected to the first sleeve, while the second free end of the first element is connected to the second sleeve. The first element is connected so that it defines a first plane passing through the major axis of the sleeves. Similarly the second element is flexible and has two ends. The first end of the second element is connected to the first sleeve, while the second end of the second element is connected to the second sleeve. The second element is connected so that it defines a second plane which also passes through the major axis of the sleeves, but is substantially transverse to the first plane defined by the first element.

BRIEF DESCRIPTION OF THE DRAWINGS

The various objects and advantages of the present invention will become apparent to those skilled in the art upon reading the following specification and by reference to the drawings in which:

FIG. 1 is an environmental view showing a structural pivot made in accordance with the teachings of this invention, the pivot being mounted to an oscillating mirror in an optical system;

FIG. 2 is an exploded perspective view of the pivot made in accordance with the teachings of the present invention;

FIG. 3 is a cross sectional view of the pivot taken along the lines 3—3 of FIG. 1;

DESCRIPTION OF THE PREFERRED EMBODIMENT

Figure 4:
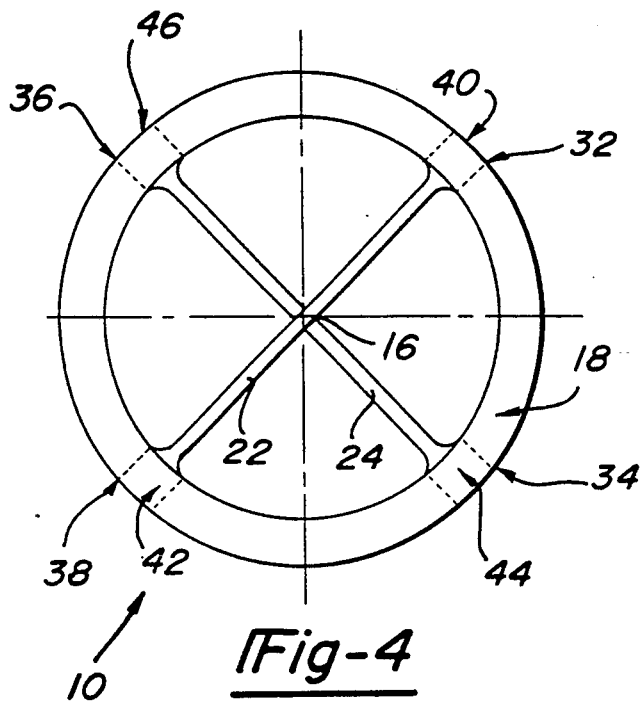
FIG. 4 is a cross sectional view taken along the lines 4—4 of FIG. 3.

With reference now to the drawings, the structural pivot 10 of the presently preferred embodiment of this invention is shown in FIG. 1 as being used in conjunction with an optical system 12 employing an oscillating mirror 14. In practice, two pivots 10 (as illustrated) are often employed on opposite sides of the mirror along a pivot axis 16.

As shown most clearly in FIG. 2, the pivot 10 includes four main parts; two substantially identical end sleeves 18 and 20; and two substantially identical flexible connecting elements 22 and 24. In the presently preferred (but not limiting) embodiment, flexible connecting elements 22 and 24 have a parallelogram shaped blade or center portion, however other shapes could also be utilized effectively. Although the pivot 10 can be mounted in a variety of manners, it is shown being mounted to mirror 14 in FIG. 1 by having sleeve 18 fixed to a mirror receptacle 26 while the other sleeve 20 is connected to a rigid mount 28.

As previously noted, each sleeve is substantially identical. For example, sleeve 18 includes an opening or slot 32 extending therethrough and a second opening or slot 34 which is located at about a 90 degree angle and is longitudinally spaced from opening 32. Openings 36 and 38 are similarly formed in sleeve 20. As will appear, these openings are used to connect the flexible elements 22, 24 to the sleeves 18, 20. The flexible elements 22 and 24 are likewise substantially identical although they are connected to the end sleeves substantially transversely to one another. Flexible element 22 is shown as having a parallelogram shaped center portion and includes a pair of ends 40 and 42. The shape of end 40 conforms to the shape of slot 32 of sleeve 18. The shape of end 42 conforms to the shape of slot 38 of sleeve 20. Analogously, flexible element 24 is shown as having a parallelogram shaped blade or center portion and has tapered ends 44 and 46. The shape of end 44 conforms to the the shape of slot 34 of sleeve 18. The shape of end 46 conforms to the shape of slot 36 of sleeve 20.

Turning now to FIGS. 3 and 4, the interconnection between the flexible elements and the sleeves will be described. The ends 40 and 42 of flexible element 22 are connected to sleeve 18 and 20, respectively. End 40 is connected to slot or opening 32 of sleeve 18. This is preferably accomplished by fitting end 40 into slot or opening 32 of sleeve 18 and by making a permanent connection through the use of an electron beam welder or an epoxy adhesive. Flexible element 22 is then connected to sleeve 20 by connecting end 42 with slot 38 of sleeve 20. This is preferably accomplished by fitting end 42 into slot or opening 38 of sleeve 20 and by making a permanent connection through the use of an electron beam welder or an epoxy adhesive. Flexible element 24 is utilized in a similar fashion. End 44 is connected to slot 34 of sleeve 18. This is preferably accomplished by fitting end 44 into slot or opening 34 of sleeve 18 and by making a permanent connection through the use of an electron beam welder or an epoxy adhesive. Flexible element 24 is further connected to sleeve 20 by connecting end 46 with slot 36 of sleeve 20. Similarly, this is preferably accomplished by fitting end 46 into slot or opening 36 of sleeve 20 and by making a permanent connection through the use of an electron beam welder or an epoxy adhesive. In addition, a pivot embodying the present invention could be machined from a single piece of metal using electrodischarge methods.

As can be seen in FIG. 4, flexible element 22 defines a plane which passes through the major axis 16 of the pivot 10. Flexible element 24 similarly defines a plane which passes through the major axis 16 of the pivot 10, this plane being substantially transverse to the plane defined by flexible element 22. Both planes pass through common axis 16. Note that each flexible element 22 and 24 is connected to both sleeves 18 and 20. In the presently preferred embodiment, this interconnection is made possible by the parallelogram shaped center portion of flexible elements 22 and 24. The parallelogram shape of the blades enables the elements to remain spaced from each other when either of the rotating members, i.e., sleeves 18 or 20, are angularly deflected. However, it will be readily apparent to those skilled in the art that shapes other than the parallelogram could be utilized for flexible elements 22 and 24.

Figure 5:
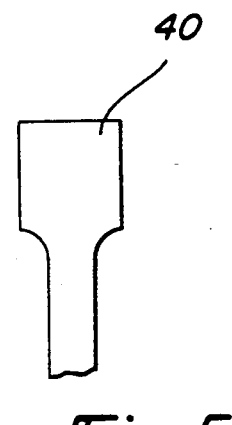
FIG. 5 is a detailed drawing of the end design utilized by the flexible elements of this invention.

Turning now to FIG. 5, note the detail drawing of the profile of end 40. Ends 42, 44 and 46 are substantially identical to end 40. The flexible elements 22 and 24 have a smooth transition to their ends 40, 42, 44 and 46 as illustrated by the detail drawing of end 40. The tapered design extends the life of pivot 10 by reducing the stress concentration which naturally occurs at the ends of flexible elements 22 and 24.

Figure 6:
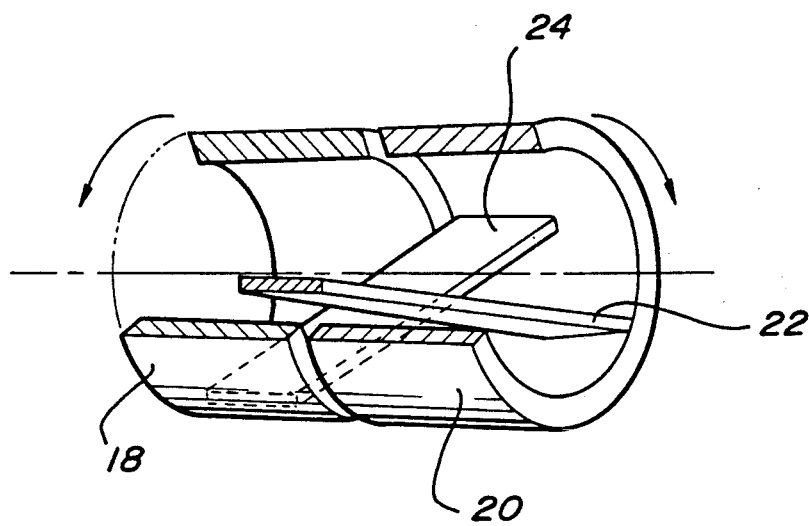
FIG. 6 is a perspective view with a cutaway portion of the invention.

Turning now to FIG. 6, a pivot embodying the present invention is shown as being subjected to angular deflection. That is, sleeve 18 is being rotated in one direction while sleeve 20 is being rotated in an opposite direction. As can be seen, flexible elements 22 and 24 are connected to the sleeves so that the elements and sleeves remain spaced apart during angular deflection.

Figure 7:
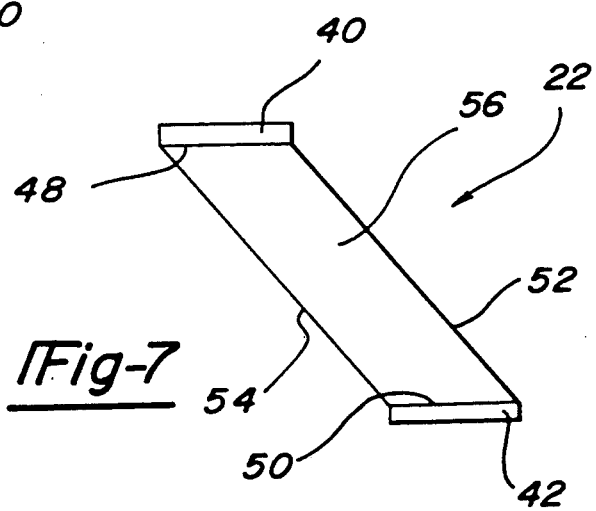
FIG. 7 is a planar view of one of the flexible elements shown in FIGS. 1 through 6.

Turning now to FIG. 7, there is illustrated the presently preferred embodiment of flexible element 22 which, as noted previously, is substantially identical to element 24. The elements 22 and 24 have a center portion 56 which is in the form of a parallelogram such as the rhomboid shown in FIG. 7. The center portion 56 of flexible element 22 is connected to ends 40 and 42. The center portion 56 of each of the elements has a pair of substantially parallel edges 52 and 54, and another pair of substantially parallel edges 48 and 50. The angle formed between edges 48 and 54 is substantially equal to the angle formed between edges 50 and 52, both angles being less than 90 degrees. The ends are used to connect the elements to the sleeves. It must be remembered that while the preferred embodiment of this invention utilizes the rhomboid parallelogram shown in FIG. 7, other shapes could be used for the center portion 56 of the flexible elements 22 and 24 that would also prevent contact between the elements during angular deflection.

The present invention derives particular advantage from the connection of flexible elements 22 and 24 to the sleeves and from the tapered design. In the presently preferred embodiment, the parallelogram shaped center portion of flexible elements 22 and 24 provides the means for connecting the sleeves 18 and 20 of pivot 10 together without the cantilevered core which is necessary in most other pivot designs, however, other shapes could be utilized. The flexible elements 22 and 24 are both bent and twisted when either of the rotating members, i.e., sleeves 18 or 20, are angularly deflected. Thus the present invention combines both flexural and torsional action, while other designs in the past have used either flexural or torsional action alone. The present invention allows flexible elements 22 and 24, which interconnect sleeves 18 and 20, to be longer than the elements used to interconnect the sleeves of other pivots. This greater length provides for greater pivot strength or greater pivot rotation angle range, for a given pivot size. All of these advantages are achieved with a comparatively simple construction.

Various other advantages will become apparent to those skilled in the art after having the benefit of studying the specification, drawings and following claims. It should be understood that while this invention was described in connection with one particular example, that other modifications will become apparent to those skilled in the art after having the benefit of studying the specification, drawings and following claims.

What is claimed is:

1. A structural pivot comprising:
   a first sleeve having a major axis and an inner surface;
   a second sleeve having a major axis and an inner surface, said second sleeve being spaced from said first sleeve;
   a first flexible element, said first element having a first and second end, said first end being connected to said first sleeve, said second end being connected to said second sleeve, said first element being connected so that it defines a first plane passing through the axes of said sleeves;
   a second flexible element, said second element having a third and fourth end, said third end being connected to said first sleeve, said fourth end being connected to said second sleeve, said second element being connected so that it defines a second plane passing through the axes of the sleeves, said second plane being substantially transverse to the first plane; and said flexible elements being connected to their respective sleeves in such manner to permit bidirectional angular rotation of either sleeve and such that said two flexible elements undergo both torsional and flexural motion when either one of said sleeves is angularly deflected with respect to said other sleeve.

2. The structural pivot of claim 1, wherein said first sleeve includes a first opening extending transversely therethrough for receiving said first end and a second opening located about 90 degrees and longitudinally spaced from the first opening for receiving said third end.

3. The structural pivot of claim 2, wherein said second sleeve includes a third opening extending transversely therethrough for receiving said second end and a fourth opening located about 90 degrees and longitudinally spaced from the third opening for receiving said fourth end.

4. The structural pivot of claim 3, wherein said first and second flexible elements are substantially identical, each flexible element consisting essentially of an elongated central blade and thicker ends with a smooth transition in thickness from the blade to the ends.

5. The structural pivot of claim 4, wherein said first flexible element has a substantially parallelogram shaped center portion and said second flexible element has a substantially parallelogram shaped center portion.

6. The structural pivot of claim 5, wherein said two sleeves are substantially cylindrical.

7. A structural pivot comprising:
a first cylindrical sleeve having a major axis and a circular inner surface, said first sleeve having a first slot extending axially from one face of said first sleeve, said first sleeve having a second slot extending axially from an opposite face of said first sleeve, said second slot being located about 90 degrees from and longitudinally spaced from the first slot;

a second cylindrical sleeve having an axis co-linear with the major axis of said first sleeve, said second sleeve having a circular inner surface, said second sleeve having a third opening or slot axially extending from one face of said second sleeve and a fourth slot axially extending from an opposite face of said second sleeve, said fourth slot being located about 90 degrees from and longitudinally spaced from the third opening;

a first flexible element made of an integral piece of metal, said first element having a parallelogram shaped center blade having a first end at one parallel edge and a second end at an opposing parallel edge, said ends being thicker than the blade, said first element including tapering portions for providing a smooth transition from the thicker ends to the thinner parallelogram shaped blade, said first end being connected to said first slot in said first sleeve, said second end being connected to said third slot of said second sleeve, said first element begin connected so that it defines a first plane passing through the axes of said sleeves;

a second flexible element made of an integral piece of metal, said second element having a parallelogram shaped center blade having a third end at one parallel edge and a fourth end at an opposing parallel edge, said ends being thicker than the blade, said second element including tapering portions for providing a smooth transition from the thicker ends to the thinner parallelogram shaped blade, said third end being connected said second slot in said first sleeve, said fourth end being connected to said fourth slot of said second sleeve, said second element being connected so that it defines a second plane passing through the axes of said sleeves, said second plane being substantially transverse to the first plane; and said flexible elements being connected to their respective sleeves in such manner to permit bidirectional angular rotation of either sleeve and such that said two flexible elements under go both torsional and flexural motion when either one of said sleeves is angularly deflected with respect to said other sleeve.

8. A optical system comprising:
an oscillating mirror;
a structural pivot including a first sleeve having a major axis and an inner surface;
a second sleeve having a major axis and an inner surface, said second sleeve being spaced from said first sleeve;
a first flexible element, said first element having a first and second end, said first end being connected to said first sleeve, said second end being connected to said second sleeve, said first element being connected so that it defines a first plane passing through the axes of said sleeves;
a second flexible element, said second element having a third and fourth end, said third end being connected to said first sleeve, said fourth end being connected to said second sleeve, said second element being connected so that it defines a second plane passing through the axes of the sleeves, said second plane being substantially transverse to the first plane; and
said flexible elements being connected to their respective sleeves in such manner to permit bidirectional angular rotation of either sleeve and such that said two flexible elements undergo both torsional and flexural motion when either one of said sleeves is angularly deflected with respect to said other sleeve;
means for connecting one of the sleeves to the mirror;
means for connecting the other sleeve to a fixed support; and
whereby said first sleeve rotates with said mirror.

9. The optical system of claim 8, wherein said first sleeve includes a first opening extending transversely therethrough for receiving said first end and a second opening located about 90 degrees and longitudinally spaced from the first opening for receiving said third end.

10. The optical system of claim 9, wherein said second sleeve includes a third opening extending transversely therethrough for receiving said second end and a fourth opening located about 90 degrees and longitudinally spaced from the third opening for receiving said fourth end.

11. The optical system of claim 10, wherein said first and second flexible elements are substantially identical, each flexible element consisting essentially of an elongated central blade and thicker ends with a smooth transition in thickness from the blade to the ends.

12. The optical system of claim 11, wherein said first flexible element has a substantially parallelogram shaped center portion and said second flexible element has a substantially parallelogram shaped center portion.

13. The optical system of claim 12, wherein said two sleeves are substantially cylindrical.

14. The optical system of claim 13, wherein each sleeve includes a pair of axially extending slots extending from opposing faces for receiving the ends of the flexible elements.

* * * * *